UNITED STATES PATENT OFFICE.

CARLETON ELLIS, OF MONTCLAIR, NEW JERSEY.

PROCESS OF ADDING HYDROGEN TO UNSATURATED FATTY MATERIAL.

1,390,687. Specification of Letters Patent. Patented Sept. 13, 1921.

No Drawing. Application filed March 16, 1916. Serial No. 84,698.

*To all whom it may concern:*

Be it known that I, CARLETON ELLIS, a citizen of the United States, and a resident of Montclair, in the county of Essex and State of New Jersey, have invented certain new and useful Improvements in Processes of Adding Hydrogen to Unsaturated Fatty Material, of which the following is a specification.

This invention relates to a process of treating organic materials, especially unsaturated fats, fatty acids and glycerids and similar material, by means of hydrogen or hydrogen-containing gas, for the purpose of saturating such unsaturated bodies to a greater or less extent and relates particularly to a process of hydrogenation involving the use of special catalytic material such as colloidal catalyzers and catalyzers formed *in situ* in oily material in conjunction with special features of temperature control which are important or essential, as the case may be, for carrying out hydrogenation processes as applied to the hardening of fatty oils under conditions affording products meeting certain commercial requirements, such as color, clarity, flavor, edibility, freedom from unsaponifiable matter, lactones and a number of other tests or standards, all according to and varying with the purpose to which the hydrogenated product is to be applied.

The atomization of oil carrying colloidal catalyst herein described and claimed is continued herein from my copending application 686,988 (now Patent 1,217,118), and the preparation of the coloidal catalyst by thermally decomposing nickel oleate is also continued herein from the same application and from my prior application 656,100 (now Patent 1,026,156).

Among the materials which may be treated in accordance with my invention are fatty acids as oleic or linoleic acids, or fatty acid mixtures, also glycerids as oleins and linoleins, including glycerids such as cotton-seed, castor, linseed, Chinese wood, perilla, soy bean, corn, peanut and fish oils, some of which glycerids also contain more or less free fatty acid.

The process of saturation is carried out with the aid of catalytic material including such catalysts as cobalt, nickel, copper and iron. Likewise under certain circumstances these elements may be employed in the form of their oxids, carbids, silicids, etc. Other compounds of silica are somewhat useful, especially colloidal silica and nickel in admixture or combination, this being covered in my copending application 873,507, Nov. 23, 1914. Carbon in its various forms and particularly charcoal may be used.

The fatty material and the like may carry catalytic material such as the bodies above mentioned, which if desired, may be employed in a colloidal form, which material may be derived from an oil-soluble material. Metallo-organic compounds more or less soluble in oil and consisting of or containing one of the metals above mentioned united to an organic radical such as a weak acid, as, for example, oleic acid, are useful to this end; especially as by properly regulating conditions, such as temperature, these metallo-organic compounds may be decomposed in a predetermined manner, setting free the catalyst, not necessarily as a pulverulent catalyzer in the ordinary sense of the term, but as an "oil-colloid" in a state of extreme subdivision, and often colloidally dissolved or existing more or less in a state of quasi-solution wonderfully conducive to accelerated hydrogen absorption by the fatty material and the like.

When such an oil colloid is to be produced by heating an oil-soluble metallo-organic compound to the requisite temperature, the selection of the metallo-organic compound preferably applied should be made with particular reference to the hydrogen absorptive properties, thermally considered, of the oil to be treated.

The conversion of oleic acid, using the various commercial or crude forms, *e. g.*, red oil, elaine oil, distilled fatty acids from various animal and vegetable oils, recovered oils of textile mills and the like, into stearic acid by the present process is most effective, ordinarily, in the presence of a colloidal catalyst or oil-colloid.

When, in the presence of an acid body, a metallic catalyzer tends to form a metallic soap, I may heat the material at the time of hydrogenation to a temperature above which the soap cannot exist as such, or if formed, immediately decomposes so that the catalyzer does not enter into solution to any undesired extent. By holding the material at a temperature about 10° C. above the decomposition point, undesirable formation of metallic soaps or metallo-organic bodies is prevented. This temperature, moreover, varies with the organic body under treatment, and preferably is determined by forming in any suitable manner the metallo-organic compound and then gradually heating until the decomposition point is reached. This temperature may thus establish the conditions governing the procedure with respect to the material in hand.

As an illustrative example, a metallo-organic compound such as nickel oleate may be heated with an oil such for instance as cottonseed oil preferably employing only a few per cent. of the nickel compound and the temperature is maintained at about 200° C., or if the oil will bear heating to a higher temperature without undesirable discoloration then the temperature may be raised somewhat higher and hydrogen is contacted with the mixture as by bubbling the gas through a body of same. Decomposition of the said nickel compound ensues and catalytic material forms resulting in due course in the addition of hydrogen to be unsaturated bodies with which the thus-formed catalyzer may come into contact. The hydrogenation stage may be carried out at a suitable temperature in the manner detailed below.

The oil may be treated in various specific ways in the presence of a colloidal metal or oxid catalyzing body, as, for example, by atomization.

I may also treat oils containing linolein, or linolenic acids or esters, to convert these highly unsaturated bodies into more saturated bodies, so that oil which would otherwise have the tendency to become gummy on exposure to air, may be rendered resistant to oxidation. A good many oils contain a small percentage of these highly unsaturated bodies and the addition of but a small amount of hydrogen to the oil suffices to overcome the undesirable quality of gumming on exposure.

According to the embodiment of the invention claimed herein, the materials are treated as a fog or mist with water gas. This may, if desired, be carried out in conjunction with the foregoing procedure. The aforesaid formation of a fog or mist is carried out by atomizing the material in a suitable atomizer. In case atomization is effected by the mutual impingement of two or more streams of jets of oil under pressure, a jet of water gas under pressure may be used to further comminute the oil. Hence, instead of a spray, a mist or fog carrying catalyzer is produced which absorbs the hydrogen.

According to the fatty material under treatment the pressure may be varied to suit the particular requirements, or varied during the operation.

Temperatures of 160–170° C. are well suited for the treatment of many fats and oils, the maximum range of temperature ordinarily is between 150 and 200° C., more or less. At the temperatures mentioned it is sometimes desirable to employ the hydrogen or hydrogen-containing gas under some pressure, preferably at least 10 lbs. to the square inch and again more effectively at a pressure of about 25 lbs. to the square inch, although pressures higher than this may be employed under certain circumstances.

The selective hydrogenation of oils to reduce merely the highly unsaturated bodies may be conducted at a somewhat lower temperature.

It should be understood that the foregoing description of procedure involved herewith is set forth purely for illustrative purposes and that the essence of the present invention prescribes no limitations respecting the manner of execution.

What I claim is:—

1. In the hydrogenation of oily materials, the step of converting the entire amount of said material to be treated, in the presence of a colloidal catalyst, into a fine mist, by water gas.

2. The step of atomizing oil carrying colloidal nickel, by a stream of water gas.

3. The step of atomizing the entire volume of the oil to be treated, while carrying colloidal nickel, by a stream of water gas free from catalyzer poisons.

CARLETON ELLIS.